United States Patent [19]
Lewis

[11] 3,888,117
[45] June 10, 1975

[54] PRESSURE SENSOR AND INSTRUMENT UTILIZING SAME

[75] Inventor: Warren F. Lewis, Goleta, Calif.

[73] Assignee: Minnesota Mining and Manufacturing Company, St. Paul, Minn.

[22] Filed: July 16, 1973

[21] Appl. No.: 379,776

[52] U.S. Cl. .............................. 73/141 A; 128/20
[51] Int. Cl. .............................................. G01l 5/00
[58] Field of Search.... 73/141 A, 161, 88 B, 150 A, 73/379, 1 R; 128/20; 200/85 R, 86 R, 159 B; 340/236, 272

[56] References Cited
UNITED STATES PATENTS

| | | | |
|---|---|---|---|
| 2,244,933 | 6/1941 | Armstrong | 200/86 R |
| 2,285,166 | 6/1942 | Malhiot | 73/161 |
| 3,623,360 | 11/1971 | Paine | 73/141 A |
| 3,668,337 | 6/1972 | Sinclair | 200/86 R X |
| 3,785,381 | 1/1974 | Lower et al. | 73/379 R X |

FOREIGN PATENTS OR APPLICATIONS

| | | | |
|---|---|---|---|
| 392,936 | 5/1933 | United Kingdom | 200/86 R |
| 535,440 | 11/1955 | Italy | 200/86 R |

*Primary Examiner*—Charles A. Ruehl
*Attorney, Agent, or Firm*—George F. Smyth

[57] ABSTRACT

A pressure indicating instrument including first and second conductors and a layer of compressible insulating material interposed between the conductors for normally holding the conductors out of electrical contact. The layer is compressible to allow the conductors to move toward each other and into electrical contact. An indicator is coupled to the conductors for indicating whether the conductors are in electrical contact.

22 Claims, 8 Drawing Figures

PATENTED JUN 10 1975 3,888,117
SHEET 1
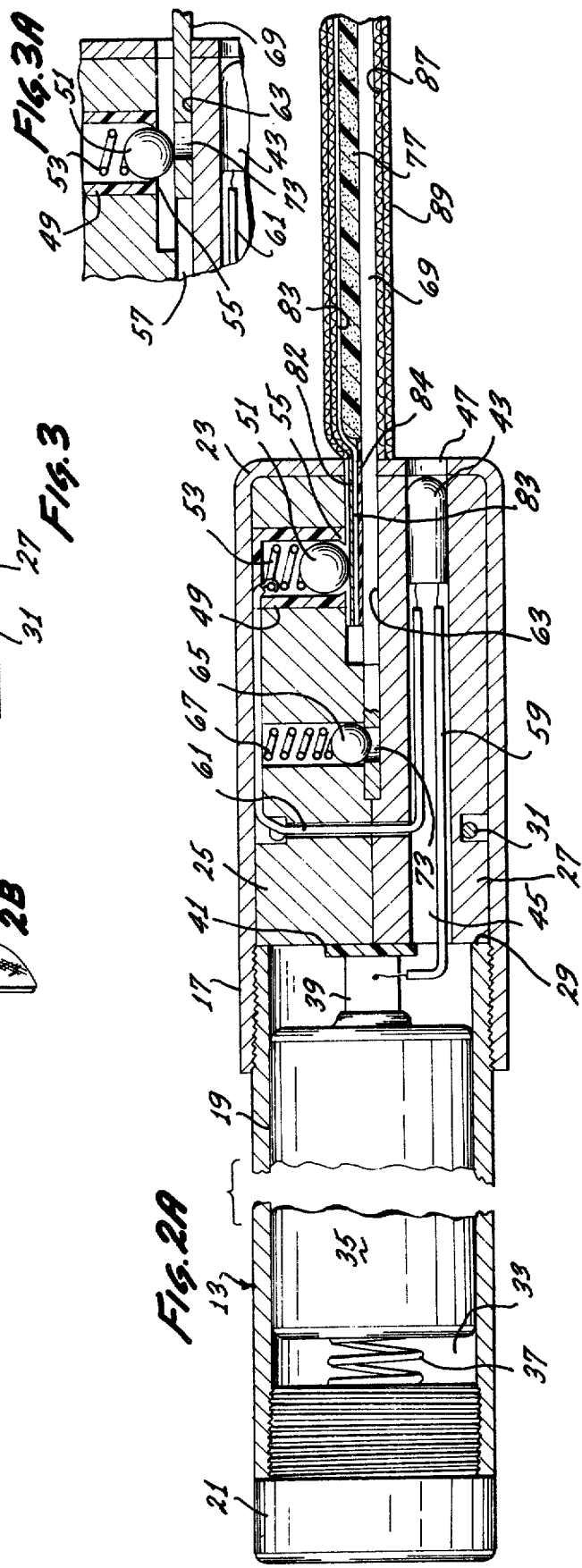
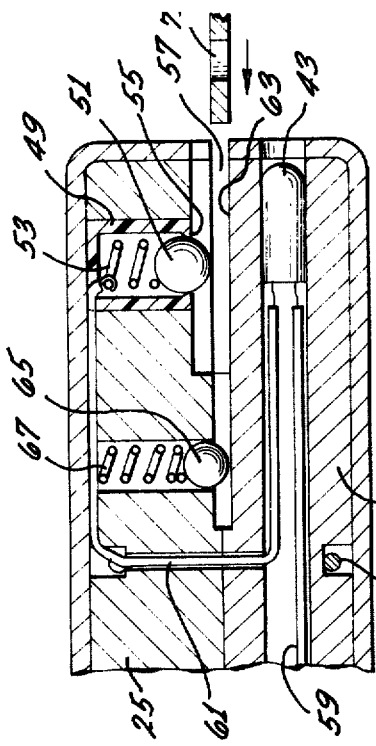
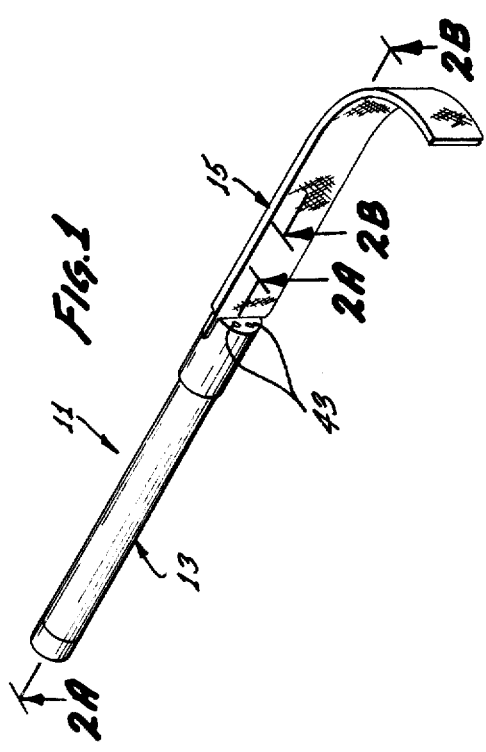

PATENTED JUN 10 1975    SHEET 2    3,888,117
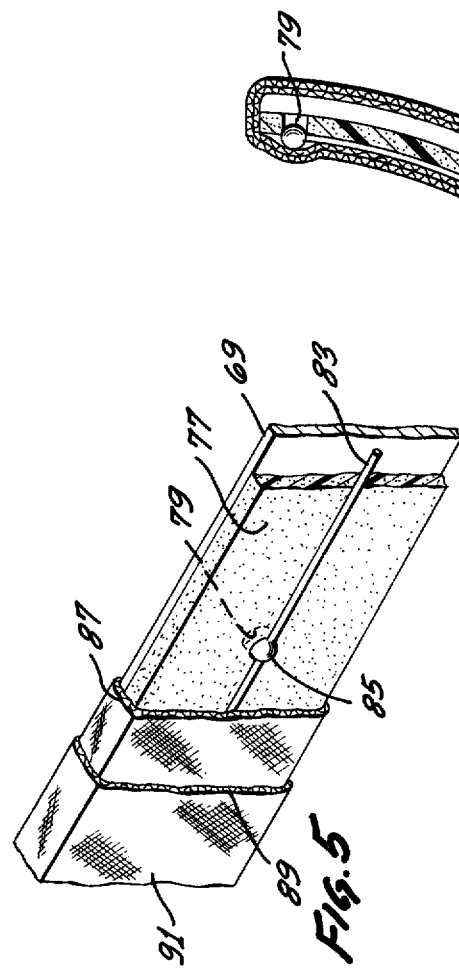
FIG. 5
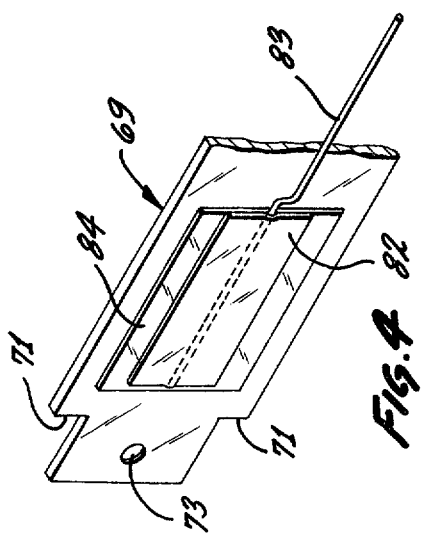
FIG. 4
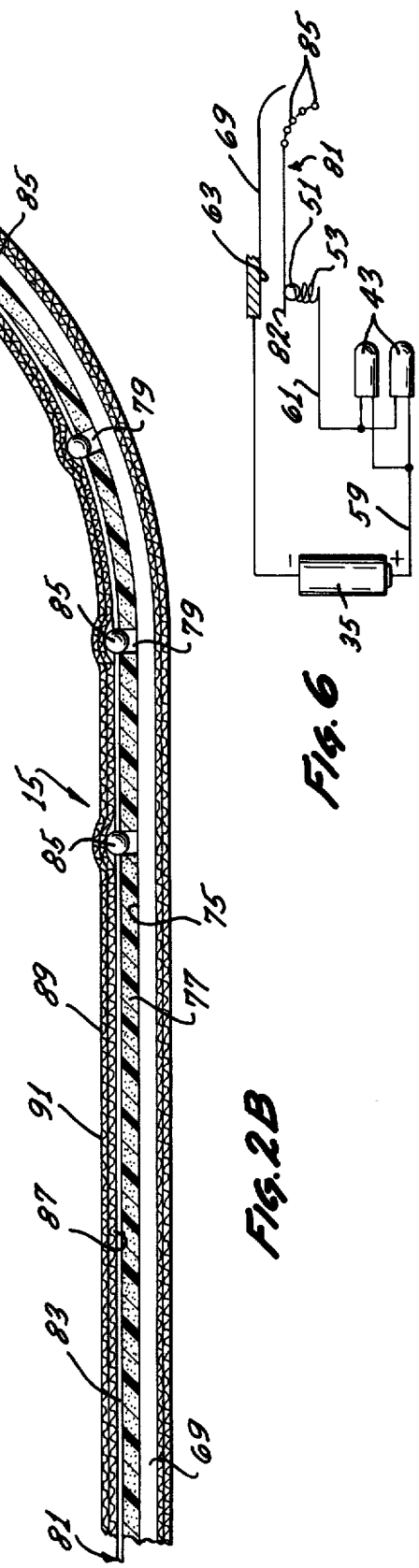
FIG. 2B
FIG. 6

PRESSURE SENSOR AND INSTRUMENT UTILIZING SAME

BACKGROUND OF THE INVENTION

In brain surgery it is sometimes necessary to move, or withdraw from the skull, portions of the brain of the patient. This function is carried out manually by the surgeon with the aid of a surgical instrument known as a brain retractor. To avoid damaging the brain, it must be very delicately handled.

A typical prior art brain retractor is a scoop-shaped metal device. One problem with such a device is that it is not always possible for even a skilled surgeon to know whether he may be applying too much force to the portion of the brain being contacted.

SUMMARY OF THE INVENTION

The brain retractor of this invention includes a pressure sensor and an indicator. The indicator provides an indication to the surgeon when the brain retractor is contacting the brain with the maximum allowable pressure. This minimizes the likelihood of brain damage resulting from use of the brain retractor.

In a broader sense, many concepts of this invention are applicable to pressure sensors, pressure indicating instruments, and other instruments and are not limited to brain retractors. In this regard, the pressure sensor may advantageously include first and second conductors and an insulator interposed between the conductors. The insulator may advantageously take the form of a layer of compressible insulating material. The insulating layer, when uncompressed, holds the conductors out of electrical contact. When the requisite compressive pressure has been applied to the insulator, the conductors are brought into electrical contact.

The pressure sensor may be considered to be a two state, pressure sensitive switch. The pressure sensor may be coupled to an indicator and a power source so that the indicator can indicate whether or not the pressure switch is open or closed.

In order to facilitate electrical contact between the conductors when the insulator is compressed by a predetermined amount, the insulator has aperture means. One of the conductors includes an elongated conductive element and at least one conductive member attached to the conductive element and positioned in the aperture means for movement toward the other conductor. To provide pressure sensitivity over a larger area, a plurality of the apertures and conductive members can be provided. Because the conductive members are interconnected by the conductive element, the sensitivity of the sensor to pressure is substantially the same along a predetermined length of the pressure sensor.

The pressure sensor preferably includes a substantially rigid base having an outer face and an inner face. At least a portion of the base is conductive and forms one of the conductors of the pressure sensor. Preferably, the base can be formed from an appropriately configured metal element.

The insulator, in addition to performing an insulating function, must also possess the requisite stress-deformation properties to allow contact between the conductors only when the insulator is subjected to a predetermined stress. To provide a clear separation between contact and noncontact conditions and to avoid any tendency of the conductors to "bounce," the insulator preferably deforms substantially at about the stress at which contact between the conductors is desired. The deformation at lower stress levels can be less to avoid having to provide an insulator which is unduly thick. Thus, the rate of change of deformation of the insulator is preferably greater at the stress level where conductor contact is desired than at lower stress levels.

One insulator possessing these properties is open cell foam materials such as plastic. Closed cell foam plastic does not have the desirable relatively high rate of change of deformation at the stress level at which conductor contact is desired.

To prevent the two conductors from being shorted out when the pressure sensor is used in a conductive environment, a substantially impervious jacket is provided to enclose the conductors and the insulating layer. This permits the pressure sensor to be used to sense liquid pressure or to be used when wet without danger of shorting out the pressure sensor.

To adapt the pressure sensor for use with a brain retractor, the outer surface of the sensor preferably has a non-adherent or non-stick characteristic so that it will not adhere to the brain. Such a non-stick characteristic can be provided, for example, by enclosing at least substantial portions of the sensor in a jacket of Teflon fabric. One or both of the non-stick and impervious jackets electrically insulates the conductors within such jackets so that the exterior of the pressure sensor will have a zero potential.

The pressure sensor is adapted for use with a handle on which it is removably mounted. The handle carries a battery, an indicator such as a light, and conductive leads adapted to contact the two conductors of the pressure sensor.

Means are provided for automatically checking the portion of the circuit carried by the handle in response to partial insertion of the pressure sensor into the handle. specifically, the handle has a recess adapted to receive the inner end of the pressure sensor. The circuit in the handle includes first and second contacts on opposite sides of the recess. At least one of the contacts is movable. The pressure sensor has a conductive section which is sized to bridge the gap between the contacts and a second section which will not ordinarily complete the circuit between the contacts. Upon partial insertion of the inner end of the pressure sensor into the recess, the first section engages both of the contacts to complete the portion of the circuit carried by the handle, thereby energizing the indicator to provide a circuit check. Upon full insertion of the inner end of the pressure sensor into the recess, the pressure sensor is automatically retained and mounted on the handle. In addition, the second section of the pressure sensor now bridges the gap between the contacts thereby opening the portion of the circuit carried by the handle.

BRIEF DESCRIPTION OF THE DRAWINGS

FIG. 1 is a perspective view of a brain retractor constructed in accordance with the teachings of this invention.

FIG. 2A is an enlarged, fragmentary, sectional view taken generally along line 2A—2A of FIG. 1.

FIG. 2B is an enlarged, fragmentary, sectional view taken generally along line 2B—2B of FIG. 1 and showing the pressure sensor.

3

FIG. 3 is a fragmentary sectional view of a portion of the handle with the pressure sensor in a position to be inserted into the handle.

FIG. 3A is a view similar to FIG. 3 with the pressure sensor partially inserted into the handle to test the circuit carried by the handle.

FIG. 4 is a fragmentary perspective view of the inner end portion of the pressure sensor.

FIG. 5 is a fragmentary perspective view of another region of the pressure sensor.

FIG. 6 is an electrical schematic view of the brain retractor.

DESCRIPTION OF THE PREFERRED EMBODIMENT

FIG. 1 shows a brain retractor 11 including a handle 13 and a retractor section in the form of a disposable pressure sensor 15. The handle 13 includes a pair of housing sections 17 and 19 (FIG. 2A) interconnected by screw threads and a closure cap 21 attached to the outer end of the housing section 19 by screw threads. The forward end of the housing 13 is closed by an end wall 23 formed integrally with the housing section 17.

A pair of conductive, metal blocks 25 and 27 are retained in the housing between the end wall 23 and an inner end 29 of the housing section 19. In addition, an assembly ring 31 surrounds the blocks 25 and 27 and holds them together.

The housing 13, between the cap 21 and the blocks 25 and 27, defines a chamber 33 for a battery 35. The battery 35 is held between a spring 37 and a contact 39. The contact 39 is mounted on an insulator 41 which in turn is suitably attached to the blocks 25 and 27. An indicator in the form of a pair of lights 43 are suitably mounted in a passage 45 in the block 27 and can be seen through openings 47 in the end wall 23.

An insulator cup 49 is mounted in a radial bore in the block 25. A movable contact in the form of a conductive ball 51 is mounted in the cup 49 and biased radially inwardly by a conductive spring 53. An annular shoulder 55 on the cup 49 prevents the ball 51 from moving radially inwardly beyond the position shown in FIG. 3.

The end wall 23 and the blocks 25 and 27 are cut away to form a recess or slot 57 (FIG. 3). A conductor 59 leads from the contact 39 to the lights 43 and a second conductor 61 leads from the lights 43 to the conductive spring 53 (FIG. 2A, 3 and 6). A surface 63 of the block 27 opposite the ball 51 forms a fixed contact.

The block 25 has a second radial bore in which a detent 65 is mounted. A spring 67 urges the detent 65 radially inwardly.

The details of the pressure sensor 15 can best be seen in FIGS. 2B, 4 and 5. The pressure sensor 15 includes a base 69 or retractor blade of a rigid, conductive material such as stainless steel. The configuration of the base 69 will depend upon the function which is to be performed. In the embodiment illustrated, the base 69 is in the form of an elongated plate-like finger, the outer end of which is curved as shown in FIGS. 1 and 2B. This configuration is desirable for brain retraction. The inner end of the base 69 is formed with a pair of shoulders 71 and an opening 73 which facilitate the mounting of the pressure sensor 15 on the handle 13. The base 69 has an inner face 75.

An insulator 77 in the form of a layer of resilient compressible material is adhered to the inner face 75. In the embodiment illustrated, the insulator 77 is constructed of open cell polyurethane foam. The stress required to substantially compress the insulator 77 can be varied and may be, for example, 200 to 400 mm of water. The insulator 77 is substantially coextensive with the inner face 75 except that the insulator 77 terminates short of the inner end of the base 69. Aperture means in the form of a plurality of aligned, equally spaced, apertures 79 is formed in the layer 77. In the uncompressed condition of the insulator 77 shown in FIG. 2B, each of the balls 85 is spaced from the surface 75 so that the base 69 and the conductor 81 are out of electrical contact.

A conductor 81, which includes conductive tape 82, an elongated conductive element or wire 83, and a plurality of conductive members or balls 85 affixed to the wire extends along the side of the insulator 77 opposite the face 75. The balls 85 are received in the apertures 79, respectively, with one of the balls being provided for each of the apertures. The conductor 81 terminates at the outermost of the balls 85. The inner end of the wire 83 is sandwiched between the conductive tape 82 and insulating tape 84 (FIG. 4). The insulating tape 84 insulates the inner end of the wire 83 from the base 69.

The pressure sensor 15 also includes a flexible jacket 87 which is constructed of a thin material which is substantially impervious to liquids. For example, the jacket 87 may be constructed of polyethylene. The jacket 87 covers a substantial section of the base 69, the insulator 77, and the conductor 81. The impervious jacket 87 is provided for the purpose of preventing liquid from making electrical contact between one of the balls 85 and the surface 75.

The pressure sensor 15 also includes an outer jacket 89. The outer jacket 89 has an outer surface 91 which has a non-stick characteristic, i.e., it will not readily adhere to materials which it contacts. Such a non-stick characteristic can be provided, for example, by constructing the outer jacket 89 of a matted Teflon fabric. One such fabric is available from Du Pont under the trademark Tyvek. If desired the properties of imperviousness and "non-stick" may be incorporated into a single jacket.

Both of the jackets 87 and 89 terminate at the conductive tape 82 as shown in FIG. 2A. Both of the jackets can be closed in any suitable manner such as by adhering them to each other and to the base 69.

In use, the inner end of the pressure sensor 15 can be inserted into the slot 57. Prior to such insertion, the spring 53 urges the ball 51 radially inwardly against the shoulder 55 as shown in FIG. 3. In addition, the spring 67 urges the detent 65 against the block 27.

When the inner end of the base 69 is inserted into the slot 57 as shown in FIG. 3, it contacts the ball 51 and biases the ball upwardly against the force of the spring 53. In addition, the base 69 electrically contacts the surface 63. This contact resulting from partial insertion of the base 69 completes the portion of the circuit carried by the handle 13 to thereby check this portion of the circuit. Specifically, a circuit is provided from the battery 35 through the conductor 59, the lights 43, the conductor 61, the spring 53, the ball 51, the base 69, the surface 63 of the block 27, the blocks 25 and 27, the housing sections 17 and 19, and the spring 37. Accordingly, in this position of the base 69, the indicator lights 43 are both energized if the circuit is functioning satisfactorily.

Upon complete insertion of the inner end of the pressure sensor 15 into the slot 57, the detent 65 will be cammed upwardly by the inner end of the base 69 and ultimately snapped into cooperative locking engagement with the opening 73 by the spring 67. This releasably retains the inner end of the pressure sensor 15 in the slot 57. Relative lateral movement of the pressure sensor 15 and the handle 13 is prevented by the side walls of the slot 57.

With the pressure sensor 15 mounted on the handle 13 as shown in FIG. 3, the ball 51 contacts the conductive tape 82 whereby the ball and the wire 83 are electrically coupled. Similarly, the base 69 is in electrical contact with the surface 63 and with the block 25.

With the pressure sensor 15 mounted on the handle 13 as shown in FIG. 2A, the electrical circuit can be represented schematically as shown in FIG. 6. Specifically, the lights 43 are coupled in parallel to the positive terminal of the battery 35 and across the conductors 59 and 61. Although any number of the lights 43 can be provided, it is preferred to employ a plurality of lights connected in parallel for redundancy. The circuit includes the conductor 61, the spring 53, and the ball 51 which contacts the conductive tape 82. The base 69 electrically contacts the surface 63 which is coupled to the negative terminal of the battery 35.

From FIG. 6, it is apparent that if the base 69 and the conductor 81 are brought into electrical contact the circuit will be completed and the lights 43 illuminated. According to the present invention, the base 69 and the conductor 81 are normally maintained out of electrical contact by the insulator 77. However, the insulator 77 is compressible in response to a predetermined compressive force to allow electrical contact between the base 69 and the conductor 81. Accordingly, the lights 43 are illuminated whenever the pressure sensor 15, and in particular the insulator 77, is subjected to a predetermined compressive pressure.

With reference to FIG. 2B, compressively loading the pressure sensor in a direction perpendicular to the plane of the insulator 77 results in compressive deformation of the insulator, i.e., reduction in the thickness of the insulator. This allows the ball 85 to move toward the base 69 through their respective apertures 79. The insulator 77 provides substantially all of the resistance of the pressure sensor 15 to compressive deformation. Just below the stress level at which contact of the balls 83 and the base 69 is desired, the insulator 77 deforms rapidly in a manner characteristic of open cell polyurethane foam. This causes the balls 85 to contact the base 69 thereby resulting in completion of the circuit described with reference to FIG. 6 and illumination of both of the lights 43.

Because the balls 85 are interconnected by the wire 83, the balls 85 cannot move completely independently of each other. The wire 83 has some rigidity so that in response to local pressurization of the sensor 15, a length of the insulator 77 will be compressed between the wire and the base 69.

Although the pressure sensor 15 responds to local pressurization, it is contemplated that it will be used for those applications where substantially the entire sensor is subjected to substantially the same pressure. This is true, for example, in the brain retraction operaton mentioned above inasmuch as the brain is relatively soft and tends to conform to the surface contour of the pressure sensor 15.

Obviously the pressure sensor 15 can be used as a pressure switch for many different applications. For example, in addition to its use in a brain retractor, it may be used to sense liquid pressure in a well or tank. The configuration of the pressure sensor 15 can be varied depending upon the use to which it is put. The elongated curved shaped illustrated in desirable for brain retraction purposes; however, this configuration may not be suited to other applications.

The number, orientation and spacing of the balls 85 and the aperture 79 can also be varied. More than one row of the balls 85 can be utilized if desired. For some applications, only a single ball may be necessary.

Although exemplary embodiments of the invention have been shown and described, many changes, modifications and substitutions may be made by those skilled in the art without necessarily departing from the spirit and scope of this invention.

I claim:

1. A pressure indicating instrument comprising:
    a pressure sensor including first and second conductors and a compressible insulator interposed between said conductors, said insulator normally holding said conductors out of electrical contact;
    said insulator being compressible in response to a compressive pressure tending to bring the first and second conductors closer together;
    at least a portion of at least one of said first and second conductors being adapted to contact the other of said first and second conductors in response to a predetermined amount of compression of said insulator, said predetermined amount of compression of said insulator corresponding to a predetermined magnitude of the compressive pressure on said pressure sensor;
    indicator means coupled to said pressure sensor and being responsive to said conductors being in electrical contact for providing an indication of the presence or absence of said predetermined magnitude of the compressive pressure on said pressure sensor;
    testing means disposed relative to the first and second conductors and being operable to enable the indicator means to provide the indication even when the insulator is not compressed; and
    said pressure sensor including a flexible jacket having a surface with non-stick characteristics, said jacket enclosing at least substantial sections of said conductors and said insulator, said compressive pressure being transmittable to said insulator through said flexible jacket.

2. A pressure indicating instrument as defined in claim 1 wherein said insulator includes resilient open cell foam material.

3. A pressure indicating instrument as defined in claim 1 wherein said first conductor includes a substantially rigid conductive member which forms a supporting base for said insulator.

4. A pressure sensor comprising:
    a substantially rigid base, at least a portion of the base being conductive;
    a layer of resiliently compressible open cell foam material having insulating properties and a controlled resiliency providing the layer with known compression characteristics;
    a conductor, said layer being intermediate said conductor and said conductive portion, said layer normally insulating said conductor from said conductive portion, said conductive portion and said conductor being electrically connectible to an external circuit whereby it can be ascertained if said conductor and said conductive portion are in electrical contact;

a flexible jacket enclosing at least substantial sections of said base, said conductor and said layer whereby in response to an external pressure greater than a predetermined magnitude on the jacket, the layer resiliently compresses to permit electrical contact between said conductive portion and the conductor; and said base being elongated and having inner and outer ends, said base having a curved adjacent said outer end, and said conductive portion including a face of said base on the inside of the curve of said curved portion.

5. A pressure sensor as defined in claim 4 wherein, said jacket is substantially impervious to liquids, and the outer surface of at least a substantial portion of the pressure sensor has a non-stick characteristic.

6. A pressure sensor as defined in claim 4, said pressure sensor being is a retractor element for a brain retractor.

7. A pressure sensor as defined in claim 4 wherein said layer has portions defining at least one aperture and characteristics responsive to the external pressure greater than the predetermined magnitude for compressing to permit contact between the conductor and the conductive portion through said aperture.

8. A pressure sensor as defined in claim 7 wherein said conductor includes an elongated conductive element and at least one conductive member attached to the conductive element, said conductive member being positioned relative to said aperture for movement toward said conductive portion upon compression of said layer.

9. A pressure sensor as defined in claim 4 wherein said layer has first and second apertures therein, said conductor including an elongated conductive element and first and second conductive members attached to said conductive element and positionable in the first and second apertures, respectively.

10. A pressure sensor as defined in claim 4 wherein, said pressure sensor is a retractor element for a brain retractor, said jacket is substantially impervious to liquids, and the outer surface of at least a substantial portion of the pressure sensor having a non-stick characteristic.

11. An instrument comprising:
a handle having a recess therein;
a tool having an inner end, said inner end being insertable into said recess of said handle of a locked position;
means for releasably retaining the inner end of the tool in said locked position in said recess whereby the tool is removably remounted on said handle;
circuit means for providing an indication when said tool encounters a predetermined condition, a first portion of said circuit means being carried by said handle and a second portion of said circuit means being carried by said tool;
indicator means for providing an indication when said first portion of said circuit means is closed; and
means responsive to partial insertion of the inner end of the tool into said recess to close said first portion of said circuit means thereby causing said indicator means to provide said indication whereby a check of said first portion of said circuit means is obtained.

12. An instrument as defined in claim 11 including means responsive to the inner end of the tool being in said locked position to open said first portion of said circuit means.

13. An instrument as defined in claim 11 including first and second contacts in said housing on opposite sides of the recess, at least one of said contacts being movable toward and away from the other of said contacts, said inner end of said tool including a conductive section sized to bridge the gap between said contacts and a second section which will not ordinarily complete the circuit between said contacts.

14. A brain retractor comprising:
a handle;
an elongated retractor section;
means for removably mounting the elongated retractor section on the handle;
said elongated retractor section having a curved section adjacent the outer end thereof, said elongated retractor section including a flexible substantially liquid impervious jacket, the outer surface of at least a substantial section of said elongated retractor having a non-stick
said elongated retractor section including a pressure switch inside said jacket, said pressure switch being in a first state when the pressure on the elongated retractor section is less than a predetermined value and being in a second state when the pressure on the elongated retractor section is greater than said predetermined value; and
circuit means carried by the handle and the retractor section and coupled to the pressure switch for indicating when the pressure switch is in said first state or said second state.

15. A brain retractor as defined in claim 14 wherein said pressure switch includes a layer of resilient foam material and first and second conductors on opposite sides of said foam material.

16. A pressure sensor adapted for use in moving an object with a pressure not greater than a particular pressure, comprising:
first conductor means having a substantially elongated, rigid configuration and a curved portion at one end thereof facilitating engagement of the object by the pressure sensor;
second conductor means disposed along at least the curved portion of the first conductor means and being responsive to the pressure of the object on the pressure sensor to move toward the first conductor means;
spacing means disposed intermediate the first conductor means and the second conductor means for normally separating the first conductor means and the second conductor means, the spacing means havng properties for being resiliently compressed in response to the pressure of the object on the pressure sensor and having properties for being compressed to a position permitting the engagement of the first conductor means and the second conductor means in response to a pressure greater than the particular pressure; and
indicating means for signaling the engagement of the first conductor means and the second conductor means to indicate a pressure on the object greater than the particular pressure.

17. The pressure sensor recited in claim 16 wherein the first conductor means comprises:
- an elongated base member having substantially rigid characteristics and a curved portion at one end thereof, the base member including a particular surface on the inside of the curved portion; and
- a first conductor disposed along at least the particular surface for engagement by the second conductor means in response to a pressure greater than the particular pressure.

18. The pressure sensor recited in claim 16 further comprising jacket means disposed to cover at least substantial sections of the first conductor means, second conductor means, and spacer means, the jacket means having properties for being substantially impervious to liquids and having an outer surface with a non-stick characteristic.

19. The pressure sensor recited in claim 18 wherein the jacket means comprises:
- a first jacket disposed to cover at least substantial sections of the first conductor means, second conductor means, and spacing means, the first jacket having properties for being substantially impervious to liquids; and
- a second jacket disposed to cover at least substantial sections of the first jacket, the second jacket having an outer surface with a non-stick characteristic.

20. The pressure sensor recited in claim 16 wherein the first conductor means, second conductor means, and spacing means form a probe and the sensor further comprises:
- a handle;
- the signaling means being disposed in the handle and having a first terminal and a second terminal which are electrically connectible to activate the signaling means; and
- the probe being insertable into the handle to a normal position in which the first conductor means engages the first terminal of the signaling means and the second conductor means engages the second terminal of the signaling means; whereby
- the first terminal and the second terminal are electrically connected to activate the signaling means when the second conductor means engages the second conductor means in response to a pressure greater than the particular pressure.

21. The pressure sensor recited in claim 20 wherein the probe is insertible into the handle to a test position and one of the first conductor means and second conductor means in the test position contacts both the first terminal and the second terminal to activate the signaling means and thereby test the signaling means.

22. The pressure sensor set forth in claim 16 wherein the first conductor means, second conductor means, and spacing means form at least a portion of a probe, and the sensor further comprises:
- a handle;
- means attached to the probe at the end of the first conductor means opposite the curved portion for connecting the probe to the handle; and
- at least a portion of the indicating means being carried by the handle.

* * * * *